March 23, 1937.   H. J. DICK   2,074,375
REFRIGERATING APPARATUS
Original Filed March 23, 1932   2 Sheets-Sheet 2

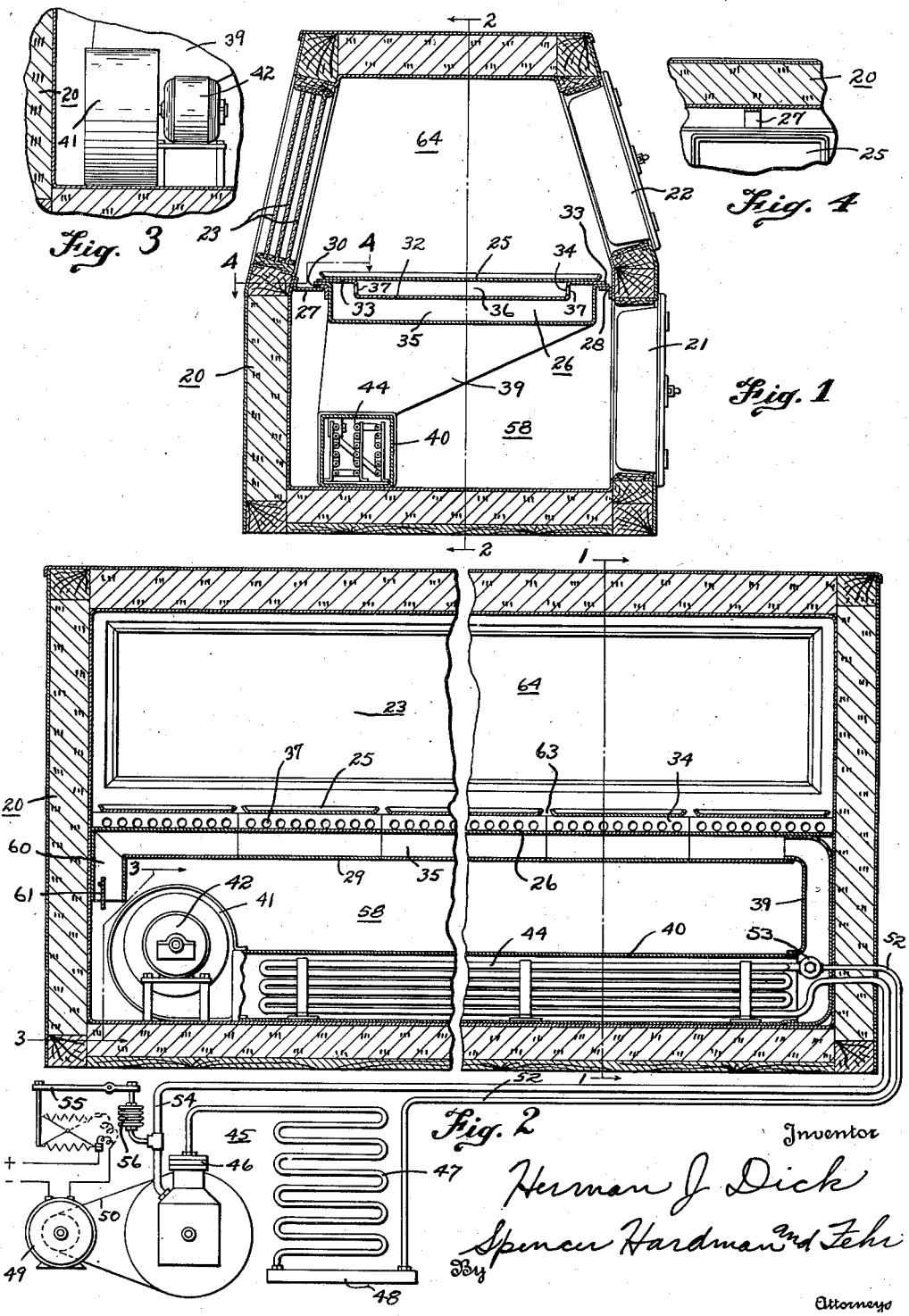

Inventor
Herman J. Dick
By Spencer Hardman and Fehr
Attorneys

Patented Mar. 23, 1937

2,074,375

UNITED STATES PATENT OFFICE 2,074,375

REFRIGERATING APPARATUS

Herman J. Dick, Dayton, Ohio, assignor, by mesne assignments, to General Motors Corporation, a corporation of Delaware Application March 23, 1932, Serial No. 600,799
Renewed May 18, 1934

18 Claims. (Cl. 62—89.5)

This invention relates to refrigerating apparatus and more particularly to refrigerator display cabinets.

The cold storage of perishable foodstuffs and particularly meats has been a troublesome problem. If the humidity and temperature are kept low, meats lose weight rapidly by dehydration. If the humidity is high to avoid loss by dehydration, slime collects on the meat and causes it to be unsalable.

Consequently it is among the objects of my invention to so provide for the cold storage of meat within a refrigerator display cabinet that the loss in weight by dehydration will be largely prevented and yet the formation of slime upon the meat is also prevented so that it will always be salable.

It is a further object of my invention to provide refrigerating means within the cabinet which will largely cool the meat by conduction through the supporting means for the meat and to control the circulation of cold air above the meat so that the formation of slime and also the loss by dehydration are largely prevented.

Further objects and advantages of the present invention will be apparent from the following description, reference being had to the accompanying drawings, wherein a preferred form of the present invention is clearly shown.

In the drawings:

Fig. 1 is a vertical transverse sectional view of a refrigerator display cabinet embodying one form of my invention taken along the line 1—1 of Fig. 2;

Fig. 2 is a section along the line 2—2 of Fig. 1;

Fig. 3 is a sectional view along the line 3—3 of Fig. 2;

Fig. 4 is a sectional view along the line 4—4 of Fig. 1;

Figure 5:
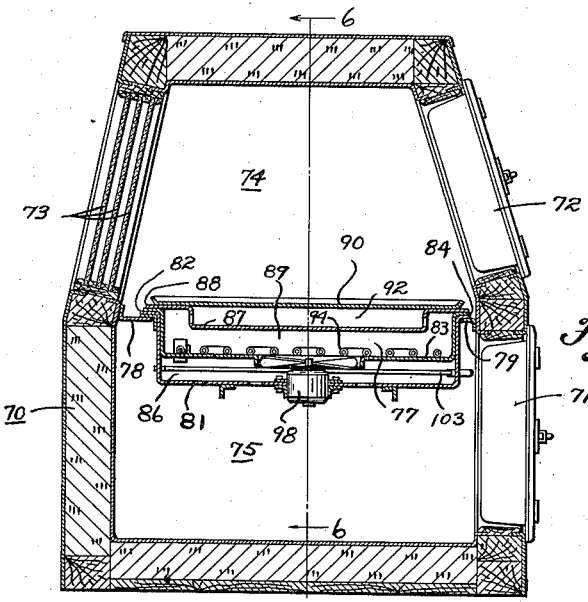
Fig. 5 is a vertical transverse sectional view of another form of my invention.

Referring to the drawings and more particularly to Fig. 1, there is shown for the purpose of illustrating my invention a refrigerator display cabinet 20 provided with insulated walls having doors 21 and 22 at the rear of the cabinet and triple pane windows 23 at the front of the cabinet so that customers may see the articles within the cabinet.

The meat or other food stuffs for sale are preferably placed in the trays 25 which extend from one end of the cabinet to the other beneath the windows 23. These trays 25 are supported by a peculiarly shaped duct means 26 which in turn is supported by the plurality of brackets 27 and 28 which extend at various points from the walls of the cabinet. The duct means 26 comprises a plurality of wide U-shaped pans 29 fitted together in end-to-end relation and provided at either side with an extending flange 30. The flanges 30 rest upon the brackets 27 and 28. Resting on top of the flanges 30 is a second set of pans 32 which are also U-shaped but which have wider flanges 33 than the pans 29 and a narrower U-shaped portion 34. The space between the lower pan 29 and the upper pan 32 provides a U-shaped air duct 35. The U-shape of the upper pans 32 provides a recess 36 in the duct means 26 immediately below the food trays 25 which recess extends from one end to the other of the duct means and consequently from end to end of the cabinet. In the sides of the U-shaped portion of the top pans 32, there are provided a plurality of apertures 37 which allow the air to flow from the air duct 35 into the air duct 36 formed by the U-shaped portion of the top pan 32 and the food trays resting thereupon.

At the right end of the cabinet, as shown in Fig. 2, the duct means 26 has a vertical portion 39 which extends downwardly and connects with another horizontal portion 40 which extends longitudinally of the cabinet near the front wall thereof. This horizontal portion 40 has its opposite end connected to a centrifugal fan 41 which is driven by an electric motor 42. Within the square duct means 40 there is provided a plurality of evaporator coils 44 which extend through the square portion 40 of the duct means 36. The evaporator coils 44 are supplied with liquid refrigerant by a suitable refrigerant liquefying apparatus generally designated by the reference character 45.

This refrigerant liquefying apparatus 45, since it is located outside of the cabinet, may be of any suitable type, but for the purposes of illustration I have disclosed a liquefying apparatus of the compression type, including a compressor 46 for compressing the refrigerant and for forwarding the compressed refrigerant to a condenser 47 where the compressed refrigerant is liquefied and collected in the receiver 48. The compressor 46 is driven by an electric motor 49 through suitable pulley and belt means 50. The liquid refrigerant in the receiver 48 is forwarded to the evaporator coils 44 through the supply conduit 52. The supply conduit 52 is preferably connected to a thermostatic expansion valve 53 which controls the flow of liquid refrigerant to the refrigerant coils 44 located within the square portion 40 of the duct means 36. The refrigerating coils 44 absorb heat from the air which is circulated through the duct means 26 by the centrifugal fan 41 to cause the liquid refrigerant within the coils 44 to evaporate under reduced pressure, which evaporated refrigerant is returned to the compressor through the return conduit 54. The operation of the electric motor 49 and therefore the compressor 46 is controlled by a low pressure switch 55 which is operated by the bellows 56 connected to the return conduit 54 and which controls the flow of current to the electric motor 49.

By this apparatus, the air, which is drawn from the lower compartment 58 formed beneath the tray supporting portion of the duct means 26 by the centrifugal fan 41, is blown through the square portion 40 of the duct means 26 over the evaporator coils 44 and up through the vertical portion 39 to the air duct 35 within the upper portion of the duct means 26. At the extreme other end of the duct means 26 there is provided a short vertical portion 60 which directs the air downwardly into the lower compartment 58. This vertical portion 60 is provided with a manually controlled damper 61 which controls the flow of air into the lower compartment 58. The damper 61 by controlling the flow of air into the lower compartment 58 creates a slight pressure within the air duct 35 which causes some of the air to flow through the apertures 37 into the recess 36 in the top of the duct means 26. The relatively cold air within the recess 36 cools the trays 25, and thereby the meat or other food stuffs, which have been placed on the tray, are cooled by conduction. The air within the recess 36 escapes therefrom by flowing upwardly through the spaces 63 around the trays 25 into the upper compartment 64 above the food trays 25. This air circulates to a somewhat limited extent within the upper compartment 64 and then is drawn downwardly between the duct means 26 and the front wall of the cabinet 20 into a lower compartment 58 by the centrifugal fan 41. By compelling the air to flow upwardly between the trays from the recess 36, the direct draft is kept off of the food stuffs stored on the trays, thereby preventing to a great extent the loss by dehydration. The circulation in the upper compartment 64 is however ample to prevent the formation of slime upon the meat or other food stuffs supported on the trays 25. By altering the positions of the damper 61 to control the discharge of air from the air duct 35, the amount of circulation in the upper compartment 64, and consequently the temperature therein, may be controlled as desired.

Figure 6:
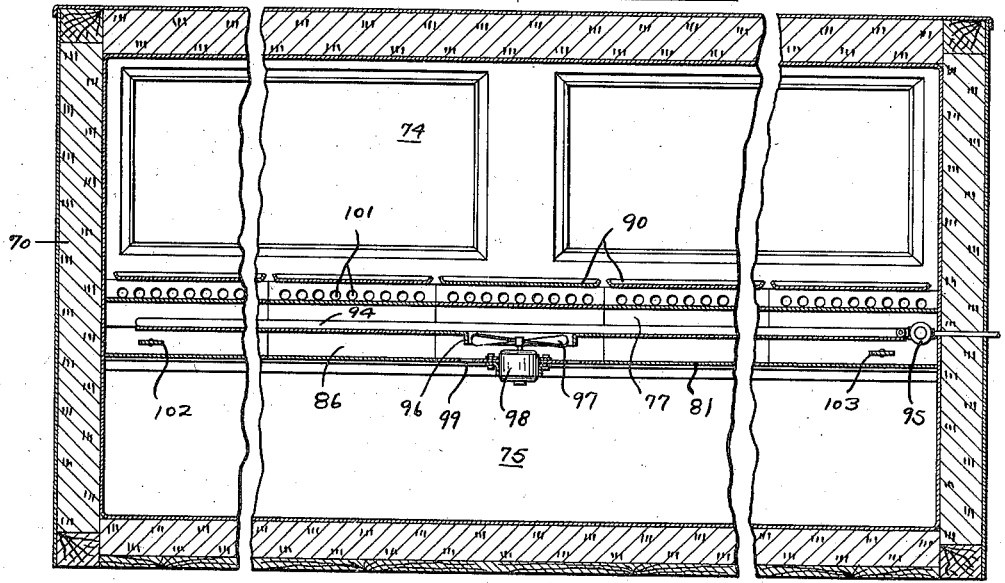
Fig. 6 is a sectional view along the line 6—6 of Fig. 5.

The form shown in Figs. 5 and 6 is similar in principle to the previous modification, but some of its structural features are different in order to provide a more compact arrangement. In this form, there is shown a refrigerator cabinet 70 of a similar type, having doors 71 and 72 in its rear wall and triple pane windows 73 in its front wall. The cabinet is divided into an upper compartment 74 and a lower compartment 75 by duct means 77 which extends from one end to the other of the cabinet 70. The duct means 77 are supported at one side by a plurality of brackets 78 and at the other side by an angle iron 79. The bottom portion of the duct means 77 is formed by a series of wide and deep U-shaped pans 81 having narrow flanges 82 at their upper edges. A second series of pans 83 having a U-shape in cross section fit within the series of deeper pans 81 and have their narrow flanges 84 resting upon the flanges 82 of the lower pan. Because of the difference in depth of the series of pans 81 and the series of pans 83 there is formed an air duct 86 between these series of pans. On the series of pans 83 there is provided an upper series of pans 87 which have a shallow U-shape in cross section of a somewhat narrower width than the intermediate pans 83. The upper pans 87 are provided with wide flanges 88 which rest upon the flanges 84 of the intermediate series of pans. By this arrangement, there is provided a second air duct 87 between the intermediate series of pans and the upper series of pans. The upper series of pans support a plurality of food trays 90 upon which meat or other food stuffs may be placed and stored. By reason of the U-shape of the upper series of pans 87, there is provided a recess 92 which extends from one end to the other of the duct means 77 and which forms a sort of an air duct.

Within the air duct 87 there is provided a serpentine refrigerant evaporator coil 94 which rests upon the intermediate series of pans 83. This serpentine evaporator coil 94 is adapted to be supplied with liquid refrigerant from the refrigerant liquefying apparatus 45 under control of a suitable expansion valve 95. At the center portion of the intermediate series of pans 83, there is provided a flanged aperture 96. Within this flanged aperture 96, there is provided a propeller type fan 97 which is driven by an electric motor 98 which is supported by the lower series of pans 81. A plurality of apertures 99 are provided in the lower pan 81 surrounding the electric motor 98 so that air may be drawn by the fan from the lower compartment 75 as well as from the air duct 86 into the air duct 89. In the air duct 89, the air is cooled by the serpentine refrigerant evaporator coils 94 and is then for the most part discharged through the apertures 101 into the recess 92 beneath the food pans 90. This cold air is discharged into the recess 92 and cools the food trays 90, and also cools the food stuff upon the trays by conduction, and then escapes upwardly between the different trays 90 into the upper compartment 74. This air circulates to a limited extent in the upper compartment 74 and then is drawn downwardly along the front of the cabinet between the duct means 77 and the front wall of the cabinet into the lower compartment 75 from which it is again drawn through the apertures 99 by the propeller type fan 97. The ends of the air ducts 89 and 86 are normally in communication with each other which is limited and controlled by the dampers 102 and 103 located adjacent the ends of the lower air duct 86. The dampers 102 and 103 control the discharge of air between the food pans 90 into the upper compartment 74 by varying the flow of air from the air duct 89 into the lower air duct 86 to vary the pressure of the air within the air duct 89. In this way the temperature of the air within the upper compartment is controlled. By the use of this principle, food stuffs are preserved in a very satisfactory manner.

While the form of embodiment of the invention as herein disclosed constitutes a preferred form, it is to be understood that other forms might be adopted, all coming within the scope of the claims which follow.

What is claimed is as follows:

1. An insulated refrigerator display cabinet including duct means having a horizontal portion within the cabinet intermediate the top and bottom thereof dividing said cabinet into an upper and a lower compartment, means for withdrawing air from the lower compartment and supplying air to said duct means, refrigerating means for cooling said air, said duct means having a plurality of distributed apertures therein from end to end of its horizontal portion for discharging the cooled air into the upper compartment, said duct means also having means for discharging the cooled air into said lower compartment and being spaced from one wall of the cabinet to provide a restricted circulation between the compartments, and means for controlling the discharge of the cooled air into said upper and lower compartments to vary the temperature and circulation of the air within said compartments.

2. An insulated refrigerator display cabinet including duct means within said cabinet, said duct means having means thereon for supporting foodstuffs to be displayed, means for supplying air to said duct means from the air beneath said duct means, means for cooling said air, said duct means having apertures therein for discharging the cooled air beneath said supporting means for said foodstuffs and means for controlling the discharge of cooled air from the duct means through said apertures.

3. An insulated refrigerator display cabinet including duct means within said cabinet, said duct means having means thereon for supporting foodstuffs to be displayed, means for supplying air to said duct means, means for cooling said air, said duct means having a recess beneath said supporting means and a plurality of apertures discharging said cooled air from said duct means into said recess for distributing the cooled air beneath said supporting means.

4. An insulated refrigerator display cabinet including duct means within said cabinet, said duct means having means thereon for supporting foodstuffs to be displayed, means for supplying air to said duct means, means for cooling said air, said duct means having a recess beneath said supporting means and a plurality of apertures discharging said cooled air from said duct means into said recess for distributing the cooled air beneath said supporting means and means for controlling the discharge of cooled air from said duct means into the recess beneath the supporting means.

5. An insulated refrigerator display cabinet including duct means within the cabinet having a recess therein extending longitudinally of said duct means, means for supplying air to said duct means, refrigerating means for cooling said air, said duct means having a plurality of apertures therein along the sides of said recess for distributing the cooled air from the duct means into said recess, a plurality of food storage trays adapted to hold food thereon supported upon said duct means and extending over said recess, said food storage trays being cooled by the cold air within the recess beneath said pans.

6. An insulated refrigerator display cabinet including duct means within the cabinet having a recess therein extending longitudinally of said duct means, means for supplying air to said duct means, refrigerating means for cooling said air, said duct means having a plurality of apertures therein along the sides of said recess for distributing the cooled air from the duct means into said recess, a plurality of food storage trays adapted to hold food thereon supported upon said duct means and extending over said recess, said food storage trays being cooled by the cold air within the recess beneath said pans, said duct means extending from end to end of said cabinet and dividing said cabinet into upper and lower compartments but permitting the circulation of air therebetween, said duct means having means discharging into said lower compartment.

7. An insulated refrigerator display cabinet including duct means within the cabinet having a recess therein extending longitudinally of said duct means, means for supplying air to said duct means, refrigerating means for cooling said air, said duct means having a plurality of apertures therein along the sides of said recess for distributing the cooled air from the duct means into said recess, a plurality of food storage trays adapted to hold food thereon supported upon said duct means and extending over said recess, said food storage trays being cooled by the cold air within the recess beneath said pans, said duct means extending from end to end of said cabinet and dividing said cabinet into upper and lower compartments but permitting the circulation of air therebetween, said duct means having means discharging into said lower compartment and means for controlling the discharge of air into said upper and lower compartments.

8. An insulated refrigerator display cabinet including supporting means within the cabinet for supporting a plurality of food trays, forced draft means for drawing air from the portion of the cabinet below said food trays for supplying and discharging air beneath said food trays for cooling the food on the trays by conduction with the trays and for circulating the air above the food upon the trays and throughout the cabinet, and refrigerating means for cooling the air supplied by said forced draft means.

9. An insulated refrigerator cabinet including a generally flat food supporting member mounted within the cabinet, duct means immediately beneath said food supporting member, said duct means including means for directing the discharge of air immediately beneath the central portions of said food supporting member and preventing the discharge of air from the duct means near the edge portion, and means for supplying air to the duct means and cooling the air.

10. An insulated refrigerator cabinet including a generally flat food supporting member mounted within the cabinet, duct means immediately beneath said food supporting member, said duct means including means for directing the discharge of air toward the central portion of the cabinet immediately beneath the food supporting member, means for partially confining the air so discharged beneath the central portion of the food supporting member, and means for supplying air to the duct means and cooling the air.

11. An insulated refrigerator cabinet including a generally flat food supporting member mounted within the cabinet, duct means immediately beneath said food supporting member, said duct means including means for directing the discharge of air immediately beneath the central portions of said food supporting member, means for partially confining the air so discharged beneath the central portion of the food supporting member, and means for supplying air to the duct means and cooling the air.

12. An insulated refrigerator cabinet including generally flat supporting means mounted within the cabinet for supporting articles to be kept cool, duct means adjacent said generally flat supporting means for discharging cooled air upon the generally flat supporting means, means for circulating and recirculating the air within the duct means and also for drawing air into the duct means, means for cooling the air within the duct means, and means for controlling the recirculation of air within the duct means and for controlling the drawing of air into the duct means.

13. An insulated refrigerator cabinet having duct means therein for discharging cooled air into the cabinet and circulating the cooled air therein, said duct means having a generally flat metal member dividing said duct means into a suction and a discharge duct, said discharge duct having means for discharging cooled air into the cabinet and said suction duct having restricted means communicating with the air in the cabinet, means for drawing air from the suction duct and forcing the air into the discharge duct, means for cooling the air within the duct means, and means for controlling the drawing of air from the cabinet into the duct means.

14. An insulated refrigerator cabinet having duct means therein for discharging cooled air into the cabinet and circulating the cooled air therein, said duct means having a generally flat metal member dividing said duct means into a suction and a discharge duct, said discharge duct having means for discharging cooled air into the cabinet and said suction duct having restricted means communicating with the air in the cabinet and the air in the discharge duct, means for cooling the flat metal member, means for drawing air from the suction duct and discharging it into the discharge duct, and means for controlling the recirculation of air within the duct means.

15. An insulated refrigerator cabinet having duct means therein for discharging cooled air into the cabinet and circulating the cooled air therein, said duct means having a generally flat metal member dividing said duct means into a suction and a discharge duct, said discharge duct having means for discharging cooled air into the cabinet and means for drawing air into the suction duct from the air in the cabinet and the air in the discharge duct and drawing the air from the suction duct and discharging the air into the discharge duct, means for cooling the air within the duct means, and means for controlling the flow of air from the discharge duct into the suction duct.

16. An insulated refrigerator display cabinet having windows at the front upper portion thereof, a generally flat horizontal partition immediately beneath the windows dividing said cabinet into an upper display compartment and a lower storage compartment, said partition being spaced from the front wall of the cabinet to permit open communication between the upper and lower compartments adjacent the front wall, said partition having means preventing open communication between the upper and lower compartments at all other parts of the cabinet, and means for taking air from the lower compartment, cooling the air, and discharging the cooled air into the upper compartment.

17. A refrigerator cabinet having a plurality of insulated walls forming a chamber therein, means disposed intermediate the top and bottom walls of said cabinet dividing said chamber into an upper storage compartment and a lower storage compartment, said means including a plurality of walls forming an air duct between said compartments, said means extending longitudinally within said chamber substantially entirely across same and constructed to provide a support for articles to be stored within said upper compartment, air cooling means within one of said compartments, circulating means for directing air within said chamber over said cooling means and through said duct, and said duct-forming means being constructed and arranged to discharge cooled air at a plurality of points beneath articles supported thereon in a direction transversely to the extension of said duct and throughout substantially the entire length of said chamber.

18. A refrigerator cabinet having a plurality of insulated walls forming a chamber therein, means disposed intermediate the top and bottom walls of said cabinet dividing said chamber into an upper storage compartment and a lower storage compartment, said means including a plurality of walls forming an air duct between said compartments, said means extending longitudinally within said chamber and substantially entirely across same to provide a support for articles to be stored within said upper compartment, air cooling means within one of said compartments, circulating means for directing air within said chamber over said cooling means and through said duct, the top wall of said duct-forming means having a depression extending substantially throughout the length of the chamber, and a plurality of spaced apart openings in the upwardly directed portions of said depression for discharging cooled air into said depression throughout the length thereof and transversely to the extension of said duct.

HERMAN J. DICK.